E. R. BERRY & E. J. GUAY.
ELECTRODE FOR ARC LAMPS.
APPLICATION FILED JULY 9, 1909.
974,227.
Patented Nov. 1, 1910.
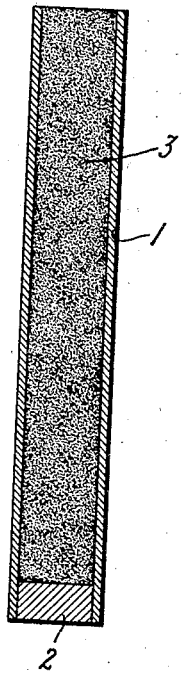
Witnesses:
Inventors:
Edward R. Berry,
Emile J. Guay,
by
Att'y

UNITED STATES PATENT OFFICE.

EDWARD R. BERRY AND EMILE J. GUAY, OF LYNN, MASSACHUSETTS, ASSIGNORS TO GENERAL ELECTRIC COMPANY, A CORPORATION OF NEW YORK.

ELECTRODE FOR ARC-LAMPS.

974,227.

Specification of Letters Patent.

Patented Nov. 1, 1910.

Application filed July 9, 1909. Serial No. 506,747.

*To all whom it may concern:*

Be it known that we, EDWARD R. BERRY and EMILE J. GUAY, citizens of the United States, residing at Lynn, county of Essex, State of Massachusetts, have invented certain new and useful Improvements in Electrodes for Arc-Lamps, of which the following is a specification.

Our invention has reference to improvements in electrodes for arc lamps in which titanium compound is used, either alone or as one of the ingredients of a filling for an electrode tube, the object of the invention being to prevent the sticking to the glass globe of the hot particles thrown off by the electrode.

It has been found that the utility of electrodes made of an iron tube containing a considerable percentage of titanium carbid is largely impaired by the fact that in its use fused particles are thrown off from the arcing end of the electrode and are projected against the inclosing globe, which, being made of glass, is fused superficially at the points where the hot particles come in contact with the same, and these particles then stick to the glass. By the continued use of the electrode this spitting and the adherence of the projected particles to the glass gradually impairs the transparency of the globe, so that after a comparatively short time the globe intercepts so much light that it has to be renewed. It has been found that the globe cannot be cleansed by any mechanical means nor efficiently by any chemical means, and the object of our invention is to avoid the adherence of the projected particles of hot titanium carbid or titanium compounds mixed with the fused iron shell to the glass. We have discovered that when in place of the iron tube an aluminium tube is used the aluminium fuses at the arcing end together with the titanium carbid or other titanium compound to a mass that does not adhere to glass when thrown off from the arcing end and projected on to the globe.

Our invention, therefore, consists in a titanium carbid or titanium compound electrode made of a tube of aluminium having the titanium compound compacted therein.

In the accompanying drawing, which forms a part of this specification, we have illustrated, in longitudinal section, an electrode made in accordance with our invention.

The electrode is composed of an aluminium shell or tube 1, closed at the lower end by a plug 2, of any suitable material, and having titanium carbid, or a mixture of titanium carbid with other materials, or other titanium compounds, in a finely divided state, as indicated at 3, packed in the tube. The thickness of the walls of the tube is of no particular consequence, and for practical purposes the tube will be made just strong enough to give the requisite rigidity to the electrode, and the filling of the tube may be either titanium carbid alone or titanium carbid mixed with other substances, or any other titanium compound, so long as the titanium is present in sufficient quantity to give to the air the peculiar characteristic due to its presence.

What we claim as new and desire to secure by Letters Patent of the United States, is,—

1. An arc light electrode composed of a tube of aluminium with titanic material compacted therein.

2. An arc light electrode composed of an aluminium tube with a filling of titanium carbid.

In witness whereof, we have hereunto set our hands this seventh day of July, 1909.

EDWARD R. BERRY
EMILE J. GUAY.

Witnesses:
JOHN A. McMANUS, Jr.,
RICHARD G. POVEY.